Patented Feb. 1, 1938

2,106,811

UNITED STATES PATENT OFFICE 2,106,811

PREPARATION OF ACETONE-SOLUBLE CELLULOSE ACETATE

George A. Richter, Berlin, N. H., assignor to Brown Company, Berlin, N. H., a corporation of Maine No Drawing. Application September 10, 1936, Serial No. 100,213

6 Claims. (Cl. 260—102)

This invention relates to the preparation of acetone-soluble cellulose acetate and deals more particularly with the transformation of so-called primary cellulose acetate, which is chloroform-soluble, to the acetone-soluble form.

According to the usual process of preparing cellulose acetate, a suitable grade of cellulose, such as cotton or wood pulp, is acetylated in an acetylating mixture comprising glacial acetic acid, acetic anhydride, and sulphuric acid or equivalent mineral acid catalyst to form a solution of what is commonly known as primary cellulose acetate. That is to say, when the primary cellulose acetate is precipitated from solution by extensive dilution with water and dried, it is soluble in chloroform but insoluble in acetone. The desired secondary or acetone-soluble form of cellulose acetate is customarily realized by adding to the substantially clear, viscous solution of the primary cellulose acetate a mixture of water, acetic acid, and sulphuric acid. The step of transforming the primary acetate to the secondary or acetone-soluble form is generally regarded as effecting a hydrolysis of the primary acetate accompanied by a splitting away of some acetyl groups from the primary acetate.

I have found that it is highly desirable to add hydrogen peroxide to the mixed reagents ordinarily employed for hydrolyzing the primary cellulose acetate to secondary or acetone-soluble form. Indeed, by carrying out the hydrolysis of the primary cellulose acetate in the presence of only a very small amount of hydrogen peroxide, based on the weight of the cellulose used as starting material in the preparation of the cellulose acetate, it is possible to improve to a noteworthy and valuable degree the color of the secondary cellulose acetate recoverable by precipitation, as ordinarily, from solution; and such color improvement is also apparent in the acetone solution of the so-recovered secondary cellulose acetate. Moreover, such color improvement is had without introducing into the secondary cellulose acetate undesirable reaction products or residues and without otherwise adversely affecting such cellulose acetate. By providing only a small amount of hydrogen peroxide in the mixed hydrolyzing reagents, that is, in the amount of 0.2% to 0.5%, based on the dry weight of cellulose, as described in the example hereinafter given, one does not even appreciably affect the viscosity of the resulting acetone-soluble cellulose acetate while realizing a marked color improvement or whitening effect.

There are various procedures that may be employed pursuant to the present invention in producing the primary cellulose acetate, the particular procedure adopted depending in large measure upon the character of the cellulose fiber used as raw material. Thus, cotton may first be treated with a mixture of glacial acetic acid and the sulphuric acid to serve as the catalyzer for the acetylating reagent; and the cotton after being uniformly treated with such acid mixture may be kept at about 40° C. for, say, two hours, whereupon the pretreated fiber associated with the pretreating acid mixture may be cooled to about 20° C. and then be treated with the acetic anhydride and additional glacial acetic acid necessary for the acetylating reaction. The temperature of the reacting ingredients may be allowed to rise gradually to about 40° C. as a maximum by the heat of the acetylating reaction, which reaction may take about three to five hours to go to completion, that is, to the point where the cellulose has been substantially completely dissolved in the acetylating mixture to form the viscous, light-colored solution known as the primary "dope".

When suitably purified wood pulp constitutes the raw material, the procedure for preparing the primary cellulose acetate dope may advantageously include an initial pretreatment of the wood pulp with glacial acetic acid in the absence of sulphuric acid. In such case, the initial pretreatment of the wood pulp with essentially only glacial acetic acid may take place at a temperature ranging from about 20° to 80° C. for about one to four hours, whereupon the sulphuric acid to be used for catalyzing the acetylating reaction may be uniformly incorporated into the fiber in admixture with more glacial acetic acid and a secondary pretreatment then conducted at about 40° C. for about two hours. The pretreated fiber and pretreating reagents may then be cooled to about 20° C. and the acetic anhydride and additional glacial acetic acid required for acetylation may be added thereto and acetylation allowed to proceed with gradual rise in temperature of the reacting ingredients to a maximum of about 40° C. until the desired substantially clear, primary cellulose acetate solution or dope is obtained.

A typical example of procedure accordant with the present invention may be carried out substantially as follows. Twenty-five parts by weight of cellulose (calculated as bone dry cellulose) suitable for acetylation, such as the kinds of cellulose mentioned, are uniformly treated with 100 parts of glacial acetic acid and permitted to stand for about one hour, whereupon 50 additional parts of glacial acetic acid in admixture with 0.4 parts of strong or substantially anhydrous sulphuric acid are uniformly admixed with cellulose and the acid-cellulose mixture allowed to stand at about 35° C. for one hour. To the acid-pretreated cellulose are then added 100 parts of glacial acetic acid and 75 parts of acetic anhydride and the mixture, which contains all the reagent necessary for complete acetylation of the cellulose, is subjected to continued agitation or mixing action for a period of possibly four hours or so, at the end of which time the cellulose is substantially completely converted into primary cellulose acetate, as attested by the fact that a substantially clear, rather viscous liquid solution of the cellulose results from the reacting ingredients. The solution of the primary cellulose acetate, which is ready for the hydrolyzing treatment of the present invention, is now treated with 75 parts of a hydrolyzing mixture containing 66% acetic acid, 1% concentrated sulphuric acid, and 33% water and also with about 0.2% to 0.5% hydrogen peroxide, based on the dry weight of the starting cellulose, which hydrogen peroxide may appear in solution in the water forming part of the hydrolyzing mixture. The hydrolyzing treatment may be carried out at about 40° C. for a period of time that may range from 10 to 40 hours, depending upon the character of the secondary or acetone-soluble cellulose acetate desired. At the end of the hydrolyzing treatment, the secondary or acetone-soluble cellulose acetate may be precipitated from the solution or dope by dilution with a large amount of water as ordinarily. The resulting flaky or fibrous precipitate of acetone-soluble cellulose acetate is recovered from suspension, thoroughly washed with water, and dried. It may then be dissolved in acetone to form a solution such as serves technically in the manufacture of artificial silk, films, and other end-products. Because of the improved whiteness of the acetone-soluble cellulose acetate prepared by the practice of the present invention, ultimate products made from such cellulose acetate are characterized by their greater freedom from color. It might be noted that the improvement in color realized by reason of the use of hydrogen peroxide in the hydrolyzing mixture is more marked in the case of celluloses that are relatively high in coloring matter or color-generating impurities. However, even in the case of starting celluloses of high purity, it is possible to effect a color improvement in the final or acetone-soluble cellulose acetate by performing the hydrolysis of the dissolved primary acetate in the presence of hydrogen peroxide. The hydrogen peroxide leaves no residue in the cellulose acetate that interferes with, or renders difficult, the precipitation and/or washing of the secondary or acetone-soluble cellulose acetate.

The acetylating mixture or procedure is subject to considerable variation and, so, too, the hydrolyzing reagents or mixture may be used in widely variant proportions relative to cellulose and be of various compositions, depending upon such factors as the composition of the acetylating mixture, the conditions under which acetylation takes place, the temperature and time conditions of hydrolysis, etc. Irrespective of the proportions of water, glacial acetic acid, and sulphuric acid constituting the hydrolyzing reagents or mixture, the addition of only about 0.2 to 0.5% hydrogen peroxide, based on the dry weight of cellulose used as starting material, to the hydrolyzing reagents effects a marked and valuable improvement in the color of the resulting acetone-soluble cellulose acetate without detrimentally affecting such acetate. While it is possible to reduce the viscosity of the acetone-soluble cellulose acetate recoverable from the dope by adding to the hydrolyzing reagents considerably more than 0.5% hydrogen peroxide, based on the dry weight of cellulose, the use of less than 0.5% hydrogen peroxide in such reagents does not detrimentally affect the resulting acetone-soluble cellulose acetate; and, as already indicated, even the viscosity of the resulting acetate is not appreciably affected when the amount of hydrogen peroxide included with the hydrolyzing reagents amounts to only about 0.2% to 0.5%, based on the dry weight of cellulose. Ordinarily, it is preferable to add the hydrogen peroxide to the primary dope at the very beginning of the hydrolyzing reaction, that is, along with the mixture of hydrolyzing reagents, but it is possible and it may sometimes be desirable to add the hydrogen peroxide to the dope in the course of the hydrolyzing reaction or practically at the completion of such reaction.

I claim:

1. In a practice of transforming a solution of chloroform-soluble cellulose acetate in its acetylating mixture to acetone-soluble form by treatment of such solution with hydrolyzing reagents, that improvement which comprises adding hydrogen peroxide to such solution in the amount of about 0.2 to 0.5%, based on the dry weight of cellulose, in the course of the treatment of such solution with the hydrolyzing reagents.

2. A process of preparing acetone-soluble cellulose acetate, which comprises acetylating cellulose with an acetylating mixture comprising glacial acetic acid, acetic anhydride, and a mineral acid catalyst to form a solution of chloroform-soluble cellulose acetate in said acetylating mixture and treating said solution with hydroyzing reagents, including water, in the presence of hydrogen peroxide in amount not exceeding about 0.5%, based on the dry weight of the cellulose, to transform its cellulose acetate content to acetone-soluble form.

3. A process of preparing acetone-soluble cellulose acetate, which comprises acetylating cellulose with an acetylating mixture comprising glacial acetic acid, acetic anhydride, and a mineral acid catalyst to form a solution of choroform-soluble cellulose acetate in said acetylating mixture and treating said solution with hydrolyzing reagents, including water, in the presence of hydrogen peroxide in the amount of about 0.2 to 0.5%, based on the dry weight of cellulose, to transform the cellulose acetate content of said solution to acetone-soluble form.

4. A process of preparing acetone-soluble cellulose acetate, which comprises acetylating cellulose with an acetylating mixture comprising glacial acetic acid, acetic anhydride, and sulphuric acid to form a solution of chloroform-soluble cellulose acetate in said acetylating mixture and treating said solution with hydrolyzing reagents, including water, acetic acid, and sulphuric acid, in the presence of hydrogen peroxide in amount not exceeding about 0.5% based on the dry weight of cellulose, to transform the cellulose acetate content of said solution to acetone-soluble form.

5. In a practice of transforming a solution of chloroform-soluble cellulose acetate in its acetylating mixture to acetone-soluble form by treatment of the solution with hydrolyzing reagents, those steps which comprise including in such solution in the course of its treatment with the hydrolyzing reagents and the transformation of its cellulose acetate content to acetone-soluble form an amount of hydrogen peroxide not exceeding about 0.5%, based on the dry weight of cellulose; and diluting the resulting solution of acetone-soluble cellulose acetate with sufficient water to precipitate its cellulose acetate content.

6. In a practice of transforming a solution of chloroform-soluble cellulose acetate in its acetylating mixture to acetone-soluble form by treatment of the solution with hydrolyzing reagents, those steps which comprise including in such solution in the course of its treatment with the hydrolzing reagents and the transformation of its cellulose acetate content to acetone-soluble form about 0.2% to 0.5% hydrogen peroxide, based on the dry weight of cellulose; and diluting the resulting solution of acetone-soluble cellulose acetate with sufficient water to precipitate its cellulose acetate content.

GEORGE A. RICHTER.